United States Patent
Zhou

(10) Patent No.: US 9,467,502 B2
(45) Date of Patent: Oct. 11, 2016

(54) METHOD, CLIENT AND CLOUD SERVER FOR REALIZING COMPLEX SOFTWARE SERVICE

(71) Applicant: ZTE CORPORATION, Shenzhen, Guangdong Province (CN)

(72) Inventor: Yi Zhou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1 day.

(21) Appl. No.: 14/396,415

(22) PCT Filed: Jun. 25, 2013

(86) PCT No.: PCT/CN2013/077826
§ 371 (c)(1),
(2) Date: Oct. 23, 2014

(87) PCT Pub. No.: WO2013/178110
PCT Pub. Date: Dec. 5, 2013

(65) Prior Publication Data
US 2015/0156251 A1    Jun. 4, 2015

(30) Foreign Application Priority Data

Aug. 24, 2012 (CN) .......................... 2012 1 0304045

(51) Int. Cl.
*H04L 29/06* (2006.01)
*H04L 29/08* (2006.01)

(52) U.S. Cl.
CPC ........... *H04L 67/10* (2013.01); *H04L 67/1012* (2013.01); *H04L 67/42* (2013.01); *H04L 67/16* (2013.01)

(58) Field of Classification Search
CPC ............................... H04L 67/10; H04L 67/42
USPC ........... 709/203, 226, 227, 229, 249; 718/1, 718/100, 104
See application file for complete search history.

(56) References Cited

U.S. PATENT DOCUMENTS 8,984,621 B2 *  3/2015 Burch ............................ 726/15
2010/0050172 A1   2/2010 Ferris
(Continued)

FOREIGN PATENT DOCUMENTS

| CN | 102075546 A | 5/2011 |
| CN | 102236554 A | 11/2011 |

(Continued)

OTHER PUBLICATIONS

"Cloud Computing is NP-Complete"—Joe Weinman, Feb. 2011 http://joeweinman.com/Resources/Joe_Weinman_Cloud_Computing_Is_NP-Complete.pdf.*

*Primary Examiner* — Randy Scott
(74) *Attorney, Agent, or Firm* — Ling Wu; Stephen Yang; Ling and Yang Intellectual Property

(57) ABSTRACT

A method, client, cloud server, and system for realizing complex software services are provided. The method includes: after receiving software service information required by a user to be provided, a client sending a request to a cloud server, wherein, the request carries the software service information required by the user to be provided; and after receiving the request, the cloud server selecting a corresponding cloud-end functional module to interact with the client according to the software service information required by the user to be provided, and providing the software service for the user. The embodiment of the present document solves the contradiction between software user demand and software user purchasing power, and the user can enjoy more abundant, powerful, steady and secure software and hardware resource services.

15 Claims, 3 Drawing Sheets

(56) References Cited

U.S. PATENT DOCUMENTS

| | | |
|---|---|---|
| 2010/0063999 A1 | 3/2010 | Hur et al. |
| 2011/0239050 A1 | 9/2011 | Malisetti et al. |
| 2012/0066670 A1* | 3/2012 | McCarthy ............ H04L 41/0806 717/169 |
| 2012/0147894 A1 | 6/2012 | Mulligan et al. |
| 2012/0227037 A1* | 9/2012 | Chang ................. G06F 9/45558 718/1 |
| 2013/0238804 A1* | 9/2013 | Tanino ................. G06F 9/5088 709/226 |

FOREIGN PATENT DOCUMENTS

| | | |
|---|---|---|
| CN | 102546826 A | 7/2012 |
| CN | 102567040 A | 7/2012 |
| CN | 102638460 A | 8/2012 |
| CN | 102868729 A | 1/2013 |

* cited by examiner

METHOD, CLIENT AND CLOUD SERVER FOR REALIZING COMPLEX SOFTWARE SERVICE

TECHNICAL FIELD

The present relates to the communication field, and in particular to a method, client, cloud server and system for realizing complex software services.

BACKGROUND OF THE RELATED ART

The software is used by the normal users increasingly as a kind of human auxiliary tools, and the demand for it by people is more and more abundant and the requirement is higher and higher at the same time. As the complexity of the software is raised, it needs increasingly high hardware configuration for support. However, for the purchasing power of a large number of users, the hardware resource that the normal personal users can have is very limited, which just leads to the fact that the software service that the personal user can enjoy will be very limited. No matter how perfect the traditional software design is, once it is sold to the user and installed onto the client, its subjectivity function is basically fixed. Even if part of its functions can be improved or expanded through the way of network upgrading, but it is only limited in the aspects, such as, improving, expanding and revising Bug, etc., and it will not let a software be turned into another software through the network upgrading. Wherein, there are many problems such as the technology, interests, etc. This causes the current situation that the user has to buy the brand new software whenever the user needs to use a certain software function (even if there is a temporary need). If the software needs very high hardware configuration for support, then the user still has to buy that. This makes that the cost paid is too high when the user wants to solve a certain problem, and the price-performance ratio is very low. And this also greatly limits the usage of the software user and the popularization of the software, after all not all users can buy that without the least hesitation.

So, a method for realizing the complex software service is required to be provided badly, which can provide more abundant, more powerful, more steady and more secure software and hardware resource services for the user and makes the cost paid by the user far less than that in the traditional software way.

CONTENT OF THE INVENTION

The technical problem that the embodiment of the present document requires to solve is to provide a method, client, cloud server and system for realizing complex software services, which makes the cost paid by the user be far less than that of the traditional software way, and the user can enjoy more abundant, powerful, steady and secure software and hardware resource services.

In order to solve the above-mentioned technical problem, the embodiment of the present document provides a method for realizing complex software services, comprising:

after receiving software service information required by a user to be provided, a client sending a request to a cloud server, wherein, the request carries the software service information required by the user to be provided;

after receiving the request, the cloud server selecting a corresponding cloud-end functional module to interact with the client according to the software service information required by the user to be provided, and providing the software service for the user.

Preferably, before the step of the client sending the request to the cloud server, further comprising:

the cloud server pushing a software service list that the cloud server can provide to the client or the client voluntarily obtaining a software service list from the cloud server, and displaying the software service list to the user for user selection.

Preferably, the above-mentioned method further comprises the cloud server presets a corresponding relation between the software service that the cloud server can provide and the cloud-end functional module;

the step of the cloud server selecting a corresponding cloud-end functional module to interact with the client according to the software service information required by the user to be provided comprises:

after receiving the request, the cloud server selecting the cloud-end functional module corresponding to the software service required by the user to be provided according to the corresponding relation to interact with the client.

Preferably, the cloud-end functional module comprises one or more cloud-end functional modules, and function supported by each cloud-end functional module is single;

the cloud-end functional module interacts with the client, and provides the software service for the user, comprising:

when the cloud-end functional module interacts with the client, further interacting with other cloud-end functional module, obtaining the corresponding software service information provided by other cloud-end functional module, and providing to the client after combination; and/or, when the cloud-end functional module interacts with the client, further notifying other cloud-end functional modules to interact with the client, providing the corresponding software service information to the client; wherein, the cloud-end functional module and other cloud-end functional module run parallelly, to support the software service provided for the user.

Preferably, the step of the cloud-end functional module interacting with the client comprises:

when the cloud-end functional module interacts with the client, according to the software service information required by the user to be provided, returning an auxiliary tool or function data to the client, or notifying the client to download the corresponding auxiliary tool or function data from the cloud server;

the client receiving the auxiliary tool or the function data returned by the cloud-end functional module, or downloading the corresponding auxiliary tool or function data from the cloud server after receiving a notification of the cloud-end functional module, and loading and running the auxiliary tool or the function data according to a mechanism established by the cloud server, and performing data exchange with the cloud-end functional module to realize the software service required by the user to be provided; the client is a container and does not possess a function of providing the required software service for user.

In order to solve the above-mentioned technical problem, the embodiment of the present document provides a cloud server for realizing complex software services, comprising:

a receiving module, configured to receive a request sent by a client, wherein, the request carries software service information required by a user to be provided;

a selection module, configured to: after receiving the request, select a corresponding cloud-end functional module to interact with the client according to the software service information required by the user to be provided, and a cloud-end functional module, configured to interact with the client and provide the software service for the user.

Preferably, the cloud server further comprises:

a pushing module, configured to push a software service list that the cloud server can provide to the client for user selection.

Preferably, the cloud server further comprises:

a configuration module, configured to preset a corresponding relation between a software service that the cloud server can provide and the cloud-end functional module; and an interaction module, configured to select the corresponding cloud-end functional module to interact with the client according to the software service information required by the user to be provided through the following way:

selecting the cloud-end functional module corresponding to the software service required by the user to be provided according to the preset corresponding relation to interact with the client.

Preferably, function supported by each cloud-end functional module is single; and the cloud-end functional module is further configured to interact with the client in a following way: when interacting with the client, further interacting with other cloud-end functional modules, obtaining the corresponding software service information provided by other cloud-end functional module, providing to the client after combination; and/or, when the cloud-end functional module interacts with the client, further notifying other cloud-end functional modules to interact with the client, providing the corresponding software service information to the client; wherein, the cloud-end functional module and other cloud-end functional module run parallelly, to support the software service provided for the user.

Preferably, the cloud-end functional module is configured to interact with the client through the following way:

when the cloud-end functional module interacts with the client, according to the software service information required by the user to be provided, returning an auxiliary tool or function data to the client, or notifying the client to download the corresponding auxiliary tool or function data from the cloud server, to realize the service required by the user to be provided.

In order to solve the above-mentioned technical problem, the embodiment of the present document provides a client for realizing complex software services, comprising:

a service request module, configured to: after receiving software service information required by a user to be provided, send a request to a cloud server, wherein, the request carries the software service information required by the user to be provided; and an interaction service providing module, configured to: interact with a cloud-end functional module, and provide the software service required by the user to be provided for the user.

Preferably, the client comprises a service list obtaining module, wherein, the service list obtaining module is configured to: after the client starts, receive the software service list, which can be provided by the cloud server, pushed to the client by the cloud server, or voluntarily obtain the software service list that the cloud server can provide from the cloud server, and display the software service list to the user for user selection.

Preferably, the interaction service providing module is configured to interact with the cloud-end functional module through the following way: when interacting with the cloud-end functional module, receive an auxiliary tool or function data returned by the cloud-end functional module, or download the corresponding auxiliary tool or function data from the cloud server after receiving a download notification of the cloud-end functional module, and load and run the auxiliary tool or the function data according to a set of mechanism established by the cloud server, and perform data exchange with the cloud-end functional module to realize the software service required by the user to be provided.

In order to solve the above-mentioned technical problem, the embodiment of the present document provides a system for realizing complex software services, comprising an above-mentioned cloud server and an above-mentioned client.

Compared with the related art, the embodiment of the present document, through the way of the cloud server combining with the client software, solves the contradiction between the software user demand and the software user purchasing power, so that the user enjoys more abundant, powerful, steady and secure software and hardware resource services, which is convenient for the user to use the software and improves the software service quality. Meanwhile, it changes the development and operation mode of the software provider, and makes it have very large profit space and a more flexible profit way.

PREFERRED EMBODIMENTS OF THE PRESENT DOCUMENT

The embodiment of the present document is described in detail with reference to the accompanying drawings hereinafter. It should be illustrated that, in the case of not conflicting, the embodiments in the present application and features in these embodiments can be combined with each other at random.

Figure 1:
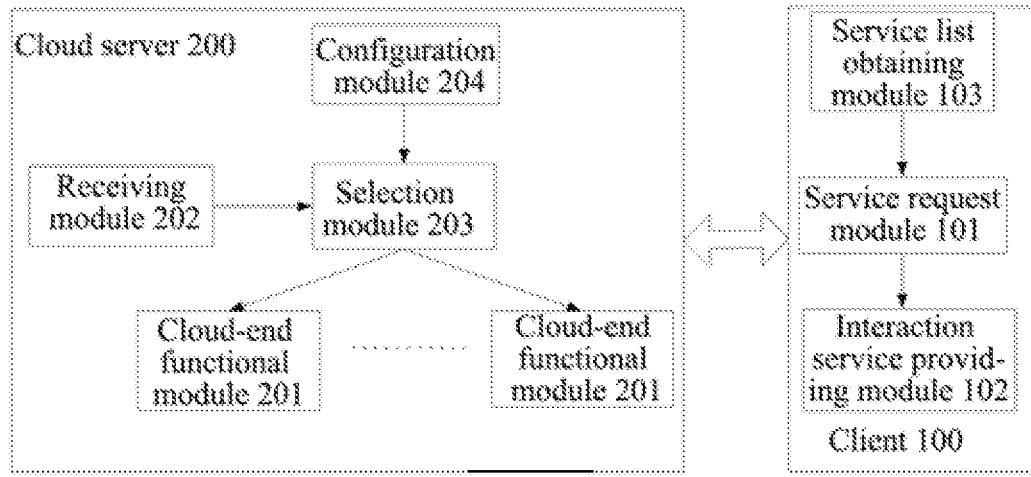
FIG. 1 is a structure diagram of a system for realizing complex software services in an embodiment of the present document.

Embodiment as shown in FIG. 1, the present embodiment provides a system for realizing the complex software service, including: a client 100 and a cloud server 200, wherein:

the cloud server 200 includes one or more cloud-end functional modules 201, and the cloud-end functional module 201 is configured to interact with the client 100, to provide the software service to the user, and the cloud server 200 can optionally add or reduce any cloud-end functional module 201 according to the design with an immediate effect, thus realizing the unlimited service expansion or reduction of the cloud server 200. Each cloud-end functional module 201 is equal therebetween without the difference of primary and secondary, while they often collaboratively work.

The function supported by each cloud-end functional module 201 can be single, that is to say, each cloud-end functional module 201 only finishes one function which cannot be decomposed again or is very difficult to be decomposed again; thus, each cloud-end functional module is only dedicated to the things that oneself should do, for example, the one responsible for a certain calculation only provides the service of that calculation, and the one responsible for the storage of certain data is only responsible for the storage of said certain data; there is also a special module, responsible for realizing a certain comprehensive function, but in fact that module is only responsible for organizing, that is, organizing the required functions to realize a certain comprehensive function, while itself is not responsible for the realization of a certain specific function therein. Since the function partitioning is single, when these cloud-end functional modules 201 work parallelly, the high-efficient processing of the cloud server 200 can be realized.

Alternatively, the cloud-end functional modules 201 are nil coupling therebetween, that is to say, any cloud-end module 201 will not affect other cloud-end modules, and they can exist independently and provide the service, and it will not lead to its own breakdown caused by other cloud-end functional module 201 going wrong, which reduces any possible coupling factor.

Besides the cloud-end functional module 201, the cloud server 200 also includes:

a receiving module 202, configured to receive a request sent by a client 100, wherein, the request carries software service information required by a user to be provided;

a selection module 203, configured to: after receiving the request, select a corresponding cloud-end functional module 201 to interact with the client 100 according to the software service information required by the user to be provided;

the cloud server 200 further comprises:

a configuration module 204, configured to preset a corresponding relation between a software service that the cloud server 200 can provide and the cloud-end functional module 201;

preferably, the cloud server 200 further includes a pushing module, wherein, the pushing module is configured to push a software service list that the cloud server 200 can provide to the client 100 for the user to select the service.

The selection module 203 is configured to select the corresponding cloud-end functional module 201 to interact with the client 100 according to the software service information required by the user to be provided through the following way:

after receiving the request, selecting the cloud-end functional module 201 corresponding to the software service required by the user to be provided according to the preset corresponding relation to interact with the client 100.

The cloud-end functional module 201 is further configured to: when interacting with the client 100, further interact with other cloud-end functional module 201, obtain the corresponding software service information provided by other cloud-end functional module 201, combine the corresponding software service information and then provide it to the client; and/or, when the cloud-end functional module interacts with the client, further notify other cloud-end functional modules to interact with the client, providing the corresponding software service information to the client; wherein, the cloud-end functional module 201 and other cloud-end functional modules 201 run parallelly, to support the software service provided for the user.

The cloud-end functional module 201 is configured to interact with the client 100 through the following way:

when the cloud-end functional module 201 interacts with the client 100, according to the software service information required by the user to be provided, returning an auxiliary tool or function data to the client 100, or notifying the client 100 to download the corresponding auxiliary tool or function data from the cloud server 200, to realize the service required by the user to be provided.

In addition, based on the difference of the functions, the hardware configurations of the cloud-end server on which the cloud-end functional module 201 runs are correspondingly different as well. For example, the module of calculation type should be put on the server with a higher CPU speed, and the module of storage type should be put on the server of which the disk capacity is large and the speed is high, the module of security type, such as, the user material, the identity management, etc., should be put on the server of which the stability and security are high, etc.

Wherein, the client 100 is installed on the user terminal, for example, the personal PC, the notebook computer, the mobile phone, etc., responsible for communicating with the cloud server 200 and loading various software services to be used by the user; the client 100 is a container, that is, the client itself does not possess any practicability function, and only provides a platform for various functional modules of the cloud server to exchange. The client 100 includes:

a service request module 101, configured to: after receiving software service information required by a user to be provided, send a request to a cloud server 200, wherein, the request carries the software service information required by the user to be provided; and an interaction service providing module 102, configured to: interact with a cloud-end functional module 201, and provide the software service required by the user to be provided for the user.

In addition, the client 100 further comprises a service list obtaining module 103, wherein, the service list obtaining module 103 is configured to: after the client 100 starts, receive the software service list, which can be provided by the cloud server 200, pushed to the client 100 by the cloud server 200, or voluntarily obtain the software service list that the cloud server 200 can provide from the cloud server 200, and display the software service list to the user for user selection.

The interaction service providing module 102 is configured to interact with the cloud-end functional module 201 through the following way: when interacting with the cloud-end functional module 201, receive an auxiliary tool or function data returned by the cloud-end functional module 201, or download the corresponding auxiliary tool or function data from the cloud server 200 after receiving a download notification of the cloud-end functional module 201, and load and run the auxiliary tool or the function data according to a mechanism established by the cloud server 200, and then perform data exchange with the cloud-end functional module to realize the software service required by the user to be provided. The interaction service providing module 102 can organize these auxiliary tools or function data locally through a cloud rule (self-defined), and these data may be organized to various types of data according to the rule (the corresponding organization rule and the loading rule, etc. can also be downloaded from the cloud server), for instance: executable file, dynamic library, database, drive, etc. Certainly, the interaction service providing module 102 further has the uninstallation function.

The user can register the user information to the cloud server through the client, thus managing the user data in unison, and the registration information can be regarded as a unique identification of the user. The interaction service providing module can download and install the corresponding client application software, and finishes the registration of the user through interacting with the user management function module of the cloud server.

Figure 2:
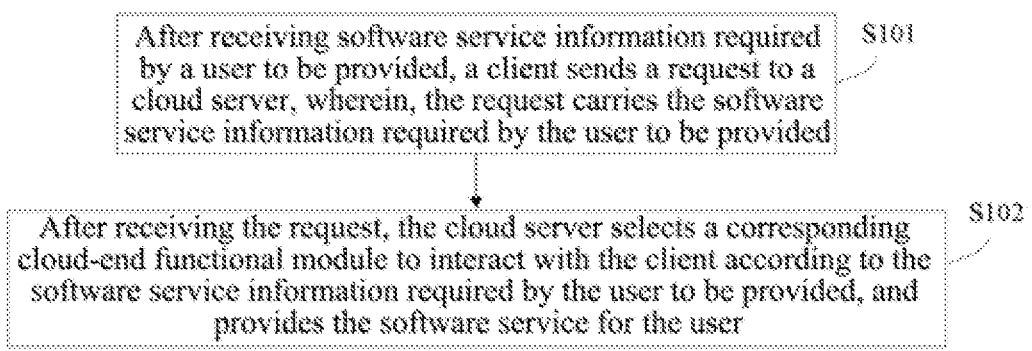
FIG. 2 is a flow chart of a method for realizing complex software services based on a cloud service in an embodiment of the present document.

As shown in FIG. 2, the present embodiment provides a method for realizing complex software services based on the cloud service, including the following steps:

in S101, after receiving software service information required by a user to be provided, a client sends a request to a cloud server, wherein, the request carries the software service information required by the user to be provided;

in S102: after receiving the request, the cloud server selects a corresponding cloud-end functional module to interact with the client according to the software service information required by the user to be provided, and provides the software service for the user.

The client will detects whether there is a network when it starts; if there is the network, then it will report to the cloud server, and the reporting process does not need the client to register. The reporting contents are some local data which are non-privacy data of the customer. The cloud server can obtain and distinguish the addresses of the clients (for instance: the information, such as IP address, etc.) after receiving the report. Before the step S101, it also includes:

the cloud server pushing a software service list that the cloud server can provide to the client or the client voluntarily obtaining the software service list that the cloud server can provide from the cloud server, and displaying the software service list to the user for user selection.

Wherein, the cloud server presets the corresponding relation between the software service that the cloud server can provide and the cloud-end functional module; in step S102, after receiving the request, the cloud server selects the cloud-end functional module corresponding to the software service required by the user to be provided according to the corresponding relation to interact with the client.

Wherein, the cloud-end functional module includes one or more cloud-end functional modules, and the cloud server can optionally add or reduce any cloud-end functional module according to the design with an immediate effect, thus realizing the unlimited service expansion or reduction of the cloud server. Each cloud-end functional module is equal therebetween without the difference of primary and secondary, while they often collaboratively work.

The function supported by each cloud-end functional module can be single, that is to say, each cloud-end functional module only finishes one function which cannot be decomposed again or is very difficult to be decomposed again; thus, each cloud-end functional module is only dedicated to the things that oneself should do, for example, the one responsible for a certain calculation only provides the service of that calculation, and the one responsible for the storage of certain data is only responsible for the storage of said certain data; there is also a special module, responsible for realizing a certain comprehensive function, but in fact that module is only responsible for organizing, that is, organizing the required functions to realize a certain comprehensive function, while itself is not responsible for the realization of a certain specific function therein. Since the function partitioning is single, when these cloud-end functional modules work parallelly, the high-efficient processing of the cloud server can be realized.

Alternatively, the cloud-end functional modules are nil coupling therebetween, that is to say, any cloud-end module will not affect other cloud-end modules, and they can exist independently and provide the service, and it will not lead to its own breakdown caused by other cloud-end functional module going wrong, which reduces any possible coupling factor.

In step S102, when the cloud-end functional module interacts with the client, further interacts with other cloud-end functional module, obtaining the corresponding software service information provided by other cloud-end functional modules, and provides to the client after combination of the corresponding software service information; and/or, when the cloud-end functional module interacts with the client, further notifies other cloud-end functional modules to interact with the client, providing the corresponding software service information to the client; wherein, the cloud-end functional module and other cloud-end functional modules run parallelly, to support the software service provided for the user.

Wherein, in the embodiment of the present document, the interaction between the client and the cloud-end functional module and between the cloud-end functional modules includes various possible network connection ways, including but not limited to WIFI, GPRS, etc.

In addition, based on the difference of the functions, the hardware configurations of the cloud-end server on which the cloud-end functional module 201 runs are correspondingly different as well. For example, the module of calculation type should be put on the server with a higher CPU speed, and the module of storage type should be put on the server of which the disk capacity is large and the speed is high, the module of security type, such as, the user material, the identity management, etc., should be put on the server of which the stability and security are high, etc.

In addition, in step 102, when the cloud-end functional module interacts with the client, according to the software service information required by the user to be provided, it returns an auxiliary tool or function data to the client, or notifies the client to download the corresponding auxiliary tool or function data from the cloud server;

the client receives the auxiliary tool or the function data returned by the cloud-end functional module, or downloads the corresponding auxiliary tool or function data from the cloud server after receiving a notification of the cloud-end functional module, and it establishes a set of mechanism with the cloud server in advance and loads and runs the auxiliary tool or the function data, and acts together with the cloud-end functional module to realize the software service required by the user to be provided. The client is a container, and it does not possess the function of providing the required software service for the user.

Wherein, the data returned by cloud-end functional module to the client (including: the auxiliary tool or the function data), besides the result data, further include: the code, the executable file, the image data, etc.; the client organizes these auxiliary tools or function data locally through the mechanism established with the cloud server after receiving these data, and these data may be organized to all kinds of data according to the rule, for instance: the executable file, the dynamic library, the database, the drive, etc., and represented on the interface, in order to realize the interface presentation and switchover of different services on the user terminal.

In an application example, the present embodiment can be assimilated to having a meeting. The client in the present embodiment is a container, just like a "meeting room", which only provides one platform for "having the meeting" for various functional modules of the cloud-end, but the platform itself does not need to attend the meeting or know the meeting content (that is, there is no need to know which service function the cloud server has), and when the user puts forward the required service to the client, it holds the cloud-end functional module that can provide the service to "have a meeting", in order to realize the user demand, and every independent function module inside the cloud server can exchange with each other freely at the same time, and finally various large-scale and complicated software functions are realized through "having a meeting".

Figure 3:
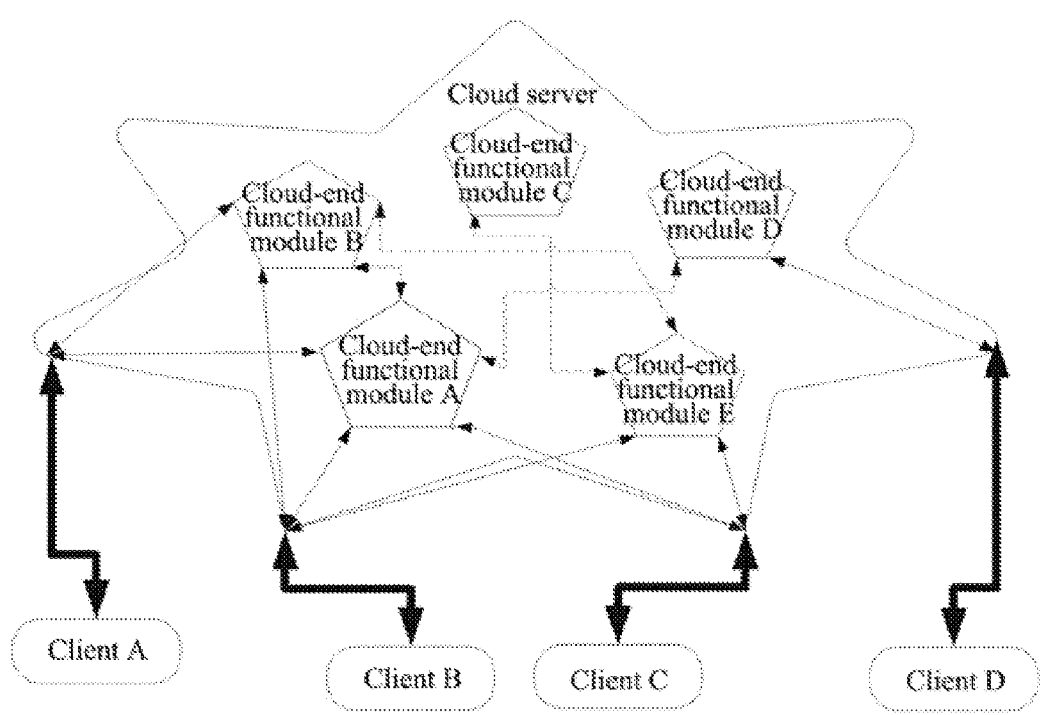
FIG. 3 is a structure diagram of a system for realizing complex software services in an application example of the present document.

As shown in FIG. 3, the thick connecting lines from the client to the cloud server represent that the client initiates a "having a meeting" request to the cloud server, that is, to request the service required by the user to be provided from the cloud server, and the "content of the meeting" is the service required by the user to be provided, and all "participants" involved in the "content of the meeting" are the cloud-end functional modules; wherein, the thin solid lines connect the client and the cloud-end functional module, just like the "meeting room", which provides a platform for "having the meeting" for the interaction of the client and the cloud-end functional module; the cloud-end functional module connected by the thin solid lines represents the "interface participants" oriented to the client, which is like the primary personnel notified for having the meeting, but in order to support some services, it also needs other cloud-end functional module to provide the corresponding function service, and therefore, in the cloud server, every function module in the cloud-end also needs to interact with each other, which is connected by the thin dotted line. Although some cloud-end functional modules are not directly involved in the "meeting room" invitation, the realization of the final function needs these cloud-end functional modules to participate in the "meeting" in fact.

Figure 4:
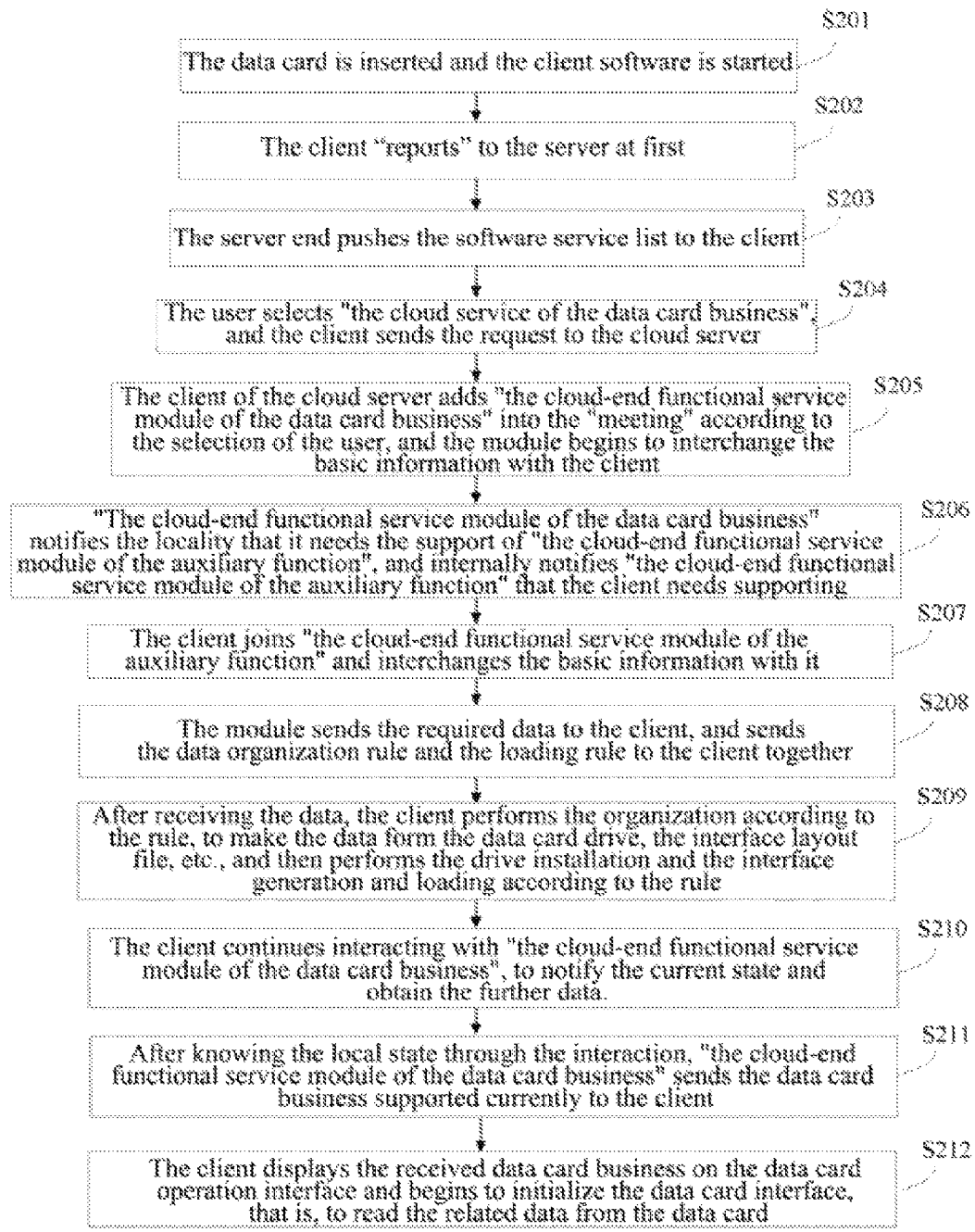
FIG. 4 is a flow chart of a method for realizing the terminal software service of a data card based on cloud services in an application example of the present document.

Below, in an application example, taking the realization of the terminal software of the data card as an example, the cloud-end functional module takes "the cloud-end functional module of the data card business" as the example, and the other cloud-end functional module takes "the cloud-end functional module of the auxiliary function" as the example, and the present embodiment is further described in detail. As shown in FIG. 4, the method for realizing the terminal software service of the data card based on the cloud services includes the following steps.

In S201: the data card is inserted and the client software is started.

At this moment, the data card does not have the drive, and the client does not possess any data operation function either.

In S202: the client "reports" to the server at first.

In S203: the server end pushes the software service list to the client.

In S204: the user selects "the cloud service of the data card business", and the client sends the request to the cloud server, and the request carries the information of "the cloud service of the data card business".

In S205: the cloud server adds "the cloud-end functional module of the data card business" into the "meeting" according to the selection of the user, and the module begins to interchange the basic information with the client.

In S206: through the information interchange, "the cloud-end functional module of the data card business" finds that the client does not have the local support, such as, the data card drive, the data card business operation interface, etc., then it notifies the locality (cloud-end) that it needs the support of "the cloud-end functional module of the auxiliary function", and internally notifies "the cloud-end functional module of the auxiliary function" that the client needs supporting.

In S207: through the "introduction" for each other of "the cloud-end functional module of the data card business", the client joins "the cloud-end functional module of the auxiliary function" and interchanges the basic information with it.

In S208: through the interchange, "the cloud-end functional module of the auxiliary function" confirm that the client is the client which is introduced by "the cloud-end functional module of the data card business" and needs the support of the local function, such as, the data card drive, the data card business operation interface, etc., and then, "the cloud-end functional module of the auxiliary function" sends the required data (for example, the data card drive, the data card business operation interface) to the client, and sends the data organization rule and the loading rule to the client together.

In S209: after receiving the data, the client performs the organization according to the rule, to make the data form the data card drive, the interface layout file, etc., and then performs the drive installation and the interface generation and loading according to the rule.

In S210: the client continues interacting with "the cloud-end functional module of the data card business", to notify the current state and obtain the further data.

In S211: after knowing the local state through the interaction, "the cloud-end functional module of the data card business" sends the data card business supported currently to the client.

In S212: the client displays the received data card business on the data card operation interface and begins to initialize the data card interface, that is, to read the related data from the data card.

Wherein, "the cloud-end functional module of the data card business" and "the cloud-end functional module of the auxiliary function" run parallelly, in order to support the software service of the data card provided for the user.

In the present application example, after finishing the above-mentioned steps, the client begins to initialize the data card; wherein, the initialization process includes the following steps.

In S301: "the cloud-end functional module of the data card business" notifies the locality which initialization data is required.

In S302: the client reads the related data from the data card and sends to the cloud-end.

In S303: "the cloud-end functional module of the data card business" splits the task after obtaining the data, and sends the split task to other internal cloud-end functional module.

These cloud-end functional modules will also interact with the client directly sometimes, and provides the business support for the inside sometimes.

In S304: the result data are calculated finally through the mutual cooperation of various internal cloud-end functional modules, and various internal cloud-end functional modules submit the result data to "the cloud-end functional module of the data card business" for combination.

In S305: "the cloud-end functional module of the data card business" combines and forms the final data and sends it to the client.

In S306: after obtaining the result data, the client displays the result data on the interface, thus finishing the initialization procedure.

In the present application example, the usage process of the user includes the following steps.

In S401: Some functions of the client interface are called, and the client notifies the relevant cloud service module what data are needed.

In S402: "the cloud-end functional module of the data card business" tells the client the required data card data.

In S403: the client obtains the data from the data card and sends it to "the cloud-end functional module of the data card business".

In S404: "the cloud-end functional module of the data card business" splits the task after obtaining the data, and sends the split task to other internal cloud-end functional module.

These cloud-end functional modules will also interact with the client directly sometimes, and provides the business support for the inside sometimes.

In S405: the result data are calculated finally through the mutual cooperation of various internal cloud-end functional modules, and various internal cloud-end functional modules submit the result data to "the cloud-end functional module of the data card business" for combination.

In S406: "the cloud-end functional module of the data card business" combines and forms the final data and sends it to the client.

In S407: after obtaining the result data, the client displays the result data on the interface, thus finishing the usage of the function.

It can be found from the above-mentioned embodiment, compared with the related art, the method, the client, the cloud server and the system for realizing the complex software service based on the cloud service provided in the above-mentioned embodiment are suitable for various terminals, through the way of the cloud server combining with the client software, it provides all possible software service functions and solves the contradiction between the software user demand and the software user purchasing power, and it can provide the abundant, powerful, steady and secure software and hardware resource services for the user. The user only needs to buy the corresponding software and hardware services according to its own demand, and the cost paid by the user will be far less than that of the traditional software way, while the enjoyed service is more abundant, powerful, steady and secure than that in the traditional software way. Meanwhile, it changes the development and operation mode of the software provider, and makes it have very large profit space and a more flexible profit way.

The achievable technical result of the embodiment of the present document is as follows:

(1), it makes the user be able to enjoy various totally different and abundant software function services through only installing one client software, like installing much software in the client;

(2), it is able to make the running speed of the software not limited to the hardware configuration of the local terminal of the user, and it makes the user be able to enjoy the high-quality software service, which can only be enjoyed in the large-scale advanced device, in the individual terminal which is configured normally;

(3), it realizes the interface presentation and switchover of different services in the user terminal;

(4), it realizes the realization of different functions of the internal and external hardware device in the user terminal;

(5), it realizes the high-efficient processing of the cloud server;

(6), it realizes the unlimited service expansion or reduction of the cloud server. Any function service provided by the cloud server can be optionally added and reduced with an immediate effect.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software functional module. The present document is not limited to any specific form of the combination of the hardware and software.

The above description is only the preferred embodiments of the present document and is not intended to limit the protection scope of the present document. The present document can have a variety of other embodiments according to the content of the invention. Those skilled in the art can make the corresponding modifications and variations according to the present document without departing from the spirit and essence of the present document. All of modifications, equivalents and/or variations without departing from the spirit and essence of the present document should be included in the protection scope of the appended claims of the present document.

INDUSTRIAL APPLICABILITY

The embodiment of the present document, through the way of the cloud server combining with the client software, solves the contradiction between the software user demand and the software user purchasing power, so that the user enjoys more abundant, powerful, steady and secure software and hardware resource services, which is convenient for the user to use the software and improves the software service quality. Meanwhile, it changes the development and operation mode of the software provider, and makes it have very large profit space and a more flexible profit way.

What is claimed is:

1. A method for realizing complex software services, comprising:
    after receiving software service information required to be provided by a user, a client sending a request to a cloud server, wherein, the request carries the software service information required to be provided by the user;
    after receiving the request, the cloud server selecting a corresponding cloud-end functional module to interact with the client and provide the software service for the user according to the software service information required to be provided by the user;
    wherein, the cloud server has one or more cloud-end functional modules, each cloud-end functional module support single function, and the cloud-end functional modules can collaboratively work therebetween;
    the selected cloud-end functional module interacting with the client and providing the software service for the user, comprises:
        while the selected cloud-end functional module interacts with the client, the selected cloud-end functional module interacting with other cloud-end functional modules to obtain corresponding software service information provided by the other cloud-end functional modules, and providing to the client after combining the software service information; and, when the selected cloud-end functional module interacts with the client, further notifying the other cloud-end functional modules to interact with the client, and providing corresponding software service information to the client;

wherein, the selected cloud-end functional module and the other cloud-end functional modules run parallelly, to support the software service provided for the user.

2. The method according to claim 1,
before the step of the client sending the request to the cloud server, further comprising:
the cloud server pushing to the client a software service list that the cloud server can provide, or the client voluntarily obtaining from the cloud server a software service list that the cloud server can provide, and displaying the software service list to the user for user selection.

3. The method according to claim 1, wherein,
the step of the cloud server selecting a corresponding cloud-end functional module according to the software service information required to be provided by the user comprises:
the cloud server selecting a cloud-end functional module corresponding to the software service required to be provided by the user according to a preset corresponding relation;
wherein, the cloud server presets a corresponding relation between software services that the cloud server can provide and the cloud-end functional modules.

4. The method according to claim 1, wherein,
the step of the cloud-end functional module interacting with the client, and providing the software service for the user, comprises:
when the cloud-end functional module interacts with the client, according to the software service information required to be provided by the user, returning an auxiliary tool or function data to the client, or notifying the client to download a corresponding auxiliary tool or function data from the cloud server;
the client receiving the auxiliary tool or the function data returned by the cloud-end functional module, or downloading the corresponding auxiliary tool or function data from the cloud server after receiving a notification of the cloud-end functional module, and loading and running the auxiliary tool or the function data according to a mechanism established by the cloud server, and then performing data exchange with the cloud-end functional module to realize the software service required to be provided by the user.

5. The method according to claim 2, wherein,
the step of the cloud server selecting a corresponding cloud-end functional module to interact with the client according to the software service information required to be provided by the user comprises:
the cloud server selecting a cloud-end functional module corresponding to the software service required by the user to be provided according to a preset corresponding relation to interact with the client;
wherein, the cloud server presets a corresponding relation between software services that the cloud server can provide and the cloud-end functional modules.

6. The method according to claim 2, wherein,
the step of the cloud-end functional module interacting with the client, and providing the software service for the user, comprises:
when the cloud-end functional module interacts with the client, according to the software service information required to be provided by the user, returning an auxiliary tool or function data to the client, or notifying the client to download a corresponding auxiliary tool or function data from the cloud server;
the client receiving the auxiliary tool or the function data returned by the cloud-end functional module, or downloading the corresponding auxiliary tool or function data from the cloud server after receiving a notification of the cloud-end functional module, and loading and running the auxiliary tool or the function data according to a mechanism established by the cloud server, and then performing data exchange with the cloud-end functional module to realize the software service required to be provided by the user.

7. A cloud server for realizing complex software services, comprising:
a receiving module receives a request sent by a client, wherein, the request carries software service information required to be provided by a user;
a selection module, after receiving the request, selects a corresponding cloud-end functional module according to the software service information required to be provided by the user; and
the selected cloud-end functional module, configured to interact with the client and provide the software service for the user;
wherein, the cloud server further comprises other cloud-end functional modules, a function supported by each cloud-end functional module is single; and
the selected cloud-end functional module is further configured to:
when interacting with the client, further interact with the other cloud-end functional modules, obtain corresponding software service information provided by the other cloud-end functional modules, and provide to the client after combining the software service information; and,
when interacting with the client, further notify the other cloud-end functional modules to interact with the client, and provide the corresponding software service information to the client;
wherein, the selected cloud-end functional module and the other cloud-end functional modules run parallelly, to support the software service provided for the user.

8. The cloud server according to claim 7, further comprising a pushing module, wherein,
the pushing module pushes to the client a software service list that the cloud server can provide, for user selection.

9. The cloud server according to claim 7, further comprising a configuration module, wherein,
the configuration module presets a corresponding relation between a software services that the cloud server can provide and the cloud-end functional modules; and
the selection module selects a corresponding cloud-end functional module according to the software service information required to be provided by the user through the following way:
selecting a cloud-end functional module corresponding to the software service required to be provided by the user according to the preset corresponding relation.

10. The cloud server according to claim 7, wherein,
the selected cloud-end functional module interacts with the client through the following way:
when interacting with the client, according to the software service information required to be provided by the user, returning an auxiliary tool or function data to the client, or notifying the client to download a corresponding auxiliary tool or function data from the cloud server, to realize services required to be provided by the user.

11. The cloud server according to claim 8, further comprising a configuration module, wherein,
the configuration module presets a corresponding relation between software services that the cloud server can provide and the cloud-end functional modules; and
the selection module selects a corresponding cloud-end functional module according to the software service information required to be provided by the user through the following way:
selecting a cloud-end functional module corresponding to the software service required to be provided by the user according to the preset corresponding relation.

12. The cloud server according to claim 8, wherein,
the selected cloud-end functional module interacts with the client through the following way:
when interacting with the client, according to the software service information required to be provided by the user, returning an auxiliary tool or function data to the client, or notifying the client to download a corresponding auxiliary tool or function data from the cloud server, to realize services required to be provided by the user.

13. A client for realizing complex software services, comprising:
a service request module, after receiving software service information required to be provided by a user, sends a request to a cloud server, wherein, the request carries the software service information required to be provided by the user; and
an interaction service providing module interacts with a cloud-end functional module, and provide software service required to be provided by the user for the user;
wherein, the cloud-end functional module is selected by the cloud server according to the software service information required to be provided by the user, there are other cloud-end functional modules in the cloud server, and a function supported by each cloud-end functional module is single; and
the interaction service providing module is further configured to:
when interacting with the selected cloud-end functional module, obtain combined software service information which is combined by the selected cloud-end functional module a corresponding software service information from the selected cloud-end functional module with software service information from the other cloud-end functional modules; and,
when interacting with the selected cloud-end functional module, receive a corresponding software service information from the selected cloud-end functional module, and receive software service information from the other cloud-end functional modules;
wherein, the selected cloud-end functional module and the other cloud-end functional modules run parallelly to support the software service provided for the user.

14. The client according to claim 13, further comprising a service list obtaining module, wherein,
the service list obtaining module, after the client starts, receives a software service list, which can be provided by the cloud server, pushed by the cloud server, or voluntarily obtain from the cloud server a software service list that the cloud server can provide, and display the software service list to the user for user selection.

15. The client according to claim 13, wherein,
the interaction service providing module is configured to interact with the cloud-end functional module through the following way:
when interacting with the selected cloud-end functional module, receive an auxiliary tool or function data returned by the selected cloud-end functional module, or download a corresponding auxiliary tool or function data from the selected cloud server after receiving a download notification of the selected cloud-end functional module, and load and run the auxiliary tool or the function data according to a set of mechanism established by the cloud server, and then perform data exchange with the cloud-end functional module to realize the software service required to be provided by the user.

* * * * *